Feb. 17, 1925.
F. W. CUFFE
RANGE
Filed April 14, 1923
1,526,775
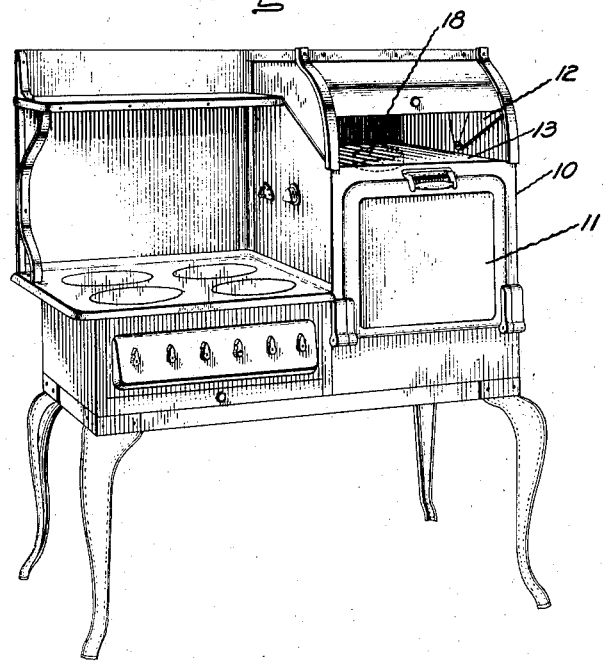
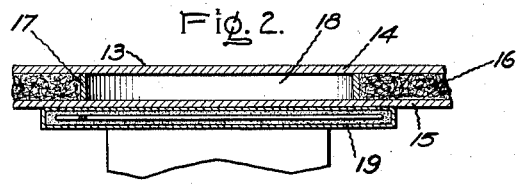
Inventor:
Fred. W. Cuffe,
by
His Attorney.

Patented Feb. 17, 1925.

1,526,775

UNITED STATES PATENT OFFICE.

FREDERICK W. CUFFE, OF STRATFORD, ONTARIO, CANADA, ASSIGNOR TO EDISON ELECTRIC APPLIANCE COMPANY, INC., OF CHICAGO, ILLINOIS, A CORPORATION OF NEW YORK.

RANGE.

Application filed April 14, 1923. Serial No. 632,140.

*To all whom it may concern:*

Be it known that I, FREDERICK W. CUFFE, a subject of the British Empire, residing at Stratford, Ontario, Canada, have invented certain new and useful Improvements in Ranges, of which the following is a specification.

My invention relates to ranges provided with warming compartments and has for its object the provision of means whereby the warming compartment may be heated in a simple, reliable and efficient manner.

More specifically my invention relates to ranges in which the warming compartment and oven have a common wall, this wall being heat insulated to prevent loss of heat from the oven. In carrying out my invention I arrange a portion of this common heat insulated wall so that the heat required for the warming compartment is transferred from the oven through this portion of the wall.

For a more complete understanding of my invention reference should be had to the accompanying drawing in which Fig. 1 is a perspective view of a range embodying my invention while Fig. 2 is a fragmentary sectional view.

Referring to the drawing I have shown my invention in one form as applied to a well known form of electrically heated range 10. The application of my invention is not limited, however, to electrically heated ranges; it may be applied to various other types of ranges. The range 10 is provided with a baking oven 11 and a warming compartment 12 which are separated by a common wall 13. This wall is heat insulated to prevent loss of heat from the oven whereby the efficiency of the oven is increased. In one form the wall 13 comprises two spaced metallic sheets 14 and 15, the sheet 14 being the upper lining of the oven and sheet 15 being the lower lining of the warming compartment. Between the metallic sheets 14 and 15 is packed a suitable heat insulating material 16, such as mineral wool.

In accordance with one form of my invention I insert a metallic member 17, shown as a ring, between the sheets 14 and 15. The heat insulating material 16 is packed around this ring 17, which has a width equal to the space between the sheets 14 and 15, whereby the insulating material 16 is excluded from a portion of the wall and a dead air space 18 thus formed between the metallic sheets 14 and 15. Preferably the ring 17 is placed directly above the upper heating unit 19 for the oven although it may be located in various positions in the common wall between the warming compartment and the oven.

The function of the ring 17 is to provide an aperture through the layer of heat insulating material 16 thus permitting the radiation of heat from the oven through the dead air space 18 to the warming compartment. The heat necessary for the warming compartment is thus transferred from the oven through the wall 13, and the amount of heat transferred being relatively small, the efficiency of the oven is not materially affected. No holes are pierced through the linings 14 and 15 and thus from all outward appearance the continuity of the dividing wall 13 is unbroken. For more effective heating, the plates or other articles to be warmed may be placed directly over the dead air space 18.

My arrangement for heating warming compartments is to be clearly distinguished from prior arrangements providing a flue between the oven and warming compartment for the passage of warm air from the oven to heat the warming compartment. Such arrangements are not satisfactory for the reason that the air from the oven contains moisture, grease, etc., which causes deposits on the walls of the warming compartment. With my arrangement no direct opening is made between the oven and warming compartment.

While I have shown my invention as applied to a warming compartment which is located above the oven, it may obviously be applied to the heating of warming compartments located in various other positions with relation to the oven.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is—

1. A range comprising an oven, a warming compartment, and a continuous wall provided with heat insulation separating said warming compartment and oven, said wall having a portion arranged so that heat passes therethrough from said oven to said warming compartment.

2. A range comprising an oven, a warming compartment, and a continuous heat insulated wall separating said warming compartment and oven, said wall having a portion so arranged that heat passes therethrough by radiation from said oven to said warming compartment.

3. A range comprising an oven, a warming compartment, and a continuous wall provided with heat insulation separating said warming compartment and oven, said wall having a portion from which said heat insulation is excluded whereby heat is transferred from said oven to said warming compartment.

4. A range comprising an oven, a warming compartment having a common continuous wall with said oven, and a layer of heat insulating material forming a part of said wall provided with an aperture through which heat is transferred from said oven.

5. A range comprising an oven, a warming compartment, a common continuous wall separating said oven from said warming compartment comprising a pair of spaced metallic sheets, heat insulating material packed between said sheets, and a member located between said sheets excluding said insulated material from a portion of said wall through which heat is transferred from said oven.

6. A range comprising an oven, a warming compartment, a common wall separating said oven from said warming compartment comprising a pair of spaced metallic sheets, heat insulating material packed between said sheets, and an annular member between said sheets around which said insulating material is packed whereby a dead air space is formed in said wall through which heat is transferred from said oven to said warming compartment by radiation from one sheet to the other.

In witness whereof, I have hereunto set my hand this 13th day of April, 1923.

FRED W. CUFFE.